March 1, 1932. H. G. HILLS 1,847,830
EXHAUST SILENCER
Filed Aug. 4, 1930
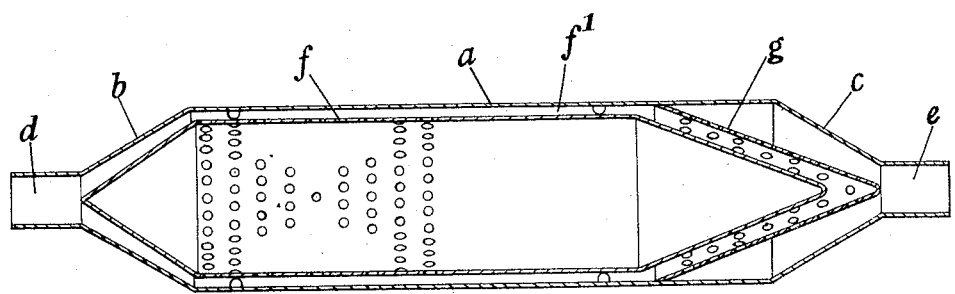
H. G. Hills
INVENTOR
Marks & Clerk
ATTys.

Patented Mar. 1, 1932

1,847,830

UNITED STATES PATENT OFFICE

HORACE GASTINEAU HILLS, OF CHEADLE HULME, CHESHIRE, ENGLAND

EXHAUST SILENCER

Application filed August 4, 1930, Serial No. 472,923, and in Great Britain August 10, 1929.

This invention has for its object to provide an improved silencer for the exhaust gases of an internal combustion engine, such silencer being efficient in action, simple in construction and not setting up a back pressure upon the engine.

The invention comprises the combination with an outer casing of an inner vessel mounted to leave a space between the two vessels for the passage of gases from the inlet to the outlet of the silencer, the inner vessel being perforated over a portion of its surface so that whilst it does not provide a passage for the flow of gases therethrough, from the silencer inlet to the outlet, its acts as a pressure equalizer by providing a space in which the pressure can be raised momentarily when the exhaust gases are at maximum pressure.

Referring to the accompanying explanatory diagram:—

The figure is a sectional elevation of a silencer constructed in one convenient form in accordance with my invention.

The silencer comprises an outer cylindrical casing $a$, having conical ends $b$, $c$ to receive the inlet and outlet connections $d$ and $e$ respectively.

An inner cylindrical vessel $f$ is supported within the casing $a$ by means which leave an annular space $f^1$ between the two vessels. The ends of the inner vessel are conical as shown and a portion of the vessel nearer to the exhaust gas inlet connection is perforated to permit the gases to enter the vessel. The perforations do not extend over more than one-half of the length of the vessel, the remaining half at the gas outlet end of the silencer being imperforate. The vessel $f$ does not therefore provide a passage for the flow of gases therethrough between the silencer inlet and outlet.

Between the end of the vessel $f$ and the conical end $c$ of the casing $a$ is arranged a perforated cone $g$.

The cross sectional area of the annular space $f^1$ between the casing $a$ and vessel $f$ where the gas enters such space should not be less than the cross sectional area of the exhaust gas inlet branch $d$, whilst the total area of the perforations in the cone $g$ should be less than the cross sectional area of the branch $d$. The annular space aforesaid may be tapered and gradually decrease in width towards the gas outlet end of the silencer.

In operation, the gases enter the silencer and pass into the annular space $f^1$ where they become cooled and reduced in volume but at the moment of maximum exhaust gas pressure, gas enters the vessel $f$ so raising the pressure therein, such gas returning to the annular space in the interval between two succeeding exhaust valve openings. The vessel $f$ therefore acts as a pressure compensator or equalizer and in practice, I find that due to its equalizing action in conjunction with the annular cooling space $f^1$, the exhaust gases leave the silencer in a steady stream practically free from noise and without imposing any back pressure upon the engine.

What I claim is:—

1. An exhaust silencer comprising in combination an outer cylindrical casing having conical ends, inlet and outlet connections attached to said conical ends, an inner cylindrical vessel having closed conical ends and mounted within said casing so as to provide an uninterrupted annular space between the casing and said inner vessel, the said inner vessel having perforations extending substantially over that half of the inner vessel at the gas inlet end of the silencer.

2. An exhaust silencer comprising in combination an outer cylindrical casing having conical ends, inlet and outlet connections attached to said conical ends, an inner cylindrical vessel having closed conical ends and mounted within said casing so as to provide an uninterrupted annular space between the casing and said inner vessel, the said inner vessel having perforations extending substantially over that half of the inner vessel at the gas inlet end of the silcener, and a perforated cone arranged at the gas outlet end of the silencer between the conical ends of the outer casing and inner vessel.

In testimony whereof I have signed my name to this specification.

HORACE GASTINEAU HILLS.